(12) United States Patent
Oguchi et al.

(10) Patent No.: US 10,200,764 B2
(45) Date of Patent: Feb. 5, 2019

(54) DETERMINATION METHOD AND DEVICE

(71) Applicant: FUJITSU LIMITED, Kawasaki-shi, Kanagawa (JP)

(72) Inventors: Atsushi Oguchi, Kawasaki (JP); Miho Sakai, Yokohama (JP); Sokichi Fujita, Chiyoda (JP); Tatsuma Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 14/813,515

(22) Filed: Jul. 30, 2015

(65) Prior Publication Data

US 2016/0066062 A1    Mar. 3, 2016

(30) Foreign Application Priority Data

Aug. 27, 2014 (JP) ................................. 2014-173149

(51) Int. Cl.
| | | |
|---|---|---|
| *H04N 21/81* | (2011.01) | |
| *H04N 21/85* | (2011.01) | |
| *H04N 21/23* | (2011.01) | |
| *G11B 27/034* | (2006.01) | |
| *H04N 21/8549* | (2011.01) | |
| *H04N 21/234* | (2011.01) | |
| *H04N 21/235* | (2011.01) | |

(52) U.S. Cl.
CPC ....... *H04N 21/8133* (2013.01); *G11B 27/034* (2013.01); *H04N 21/2353* (2013.01); *H04N 21/23418* (2013.01); *H04N 21/8549* (2013.01)

(58) Field of Classification Search
None
See application file for complete search history.

(56) References Cited

U.S. PATENT DOCUMENTS

| 8,103,107 B2 | 1/2012 | Yamamoto |
| 9,530,061 B2* | 12/2016 | Oguchi .............. G06K 9/00744 |
| 2002/0126318 A1* | 9/2002 | Katayama .............. A63B 71/06 |
| | | 358/402 |
| 2003/0182620 A1* | 9/2003 | Errico .............. H04N 21/23614 |
| | | 715/202 |

(Continued)

FOREIGN PATENT DOCUMENTS

| JP | 2003-264771 | 9/2003 |
| JP | 2005-269015 | 9/2005 |

(Continued)

OTHER PUBLICATIONS

Taiwanese Office Action dated Jul. 5, 2016 in corresponding Taiwanese Patent Application No. 104124755.

(Continued)

*Primary Examiner* — Reza Aghevli
(74) *Attorney, Agent, or Firm* — Staas & Halsey LLP

(57) ABSTRACT

A determination device includes a processor that executes a procedure. The procedure includes, from captured footage of a baseball game including plural frames stored in a storage section, determining plural consecutive frames, which each have a specific characteristic and in which a change is detected in a ball count number, an out count number, or a runner number acquired from image information representing the game situation, to be a pitching scene.

13 Claims, 13 Drawing Sheets

(56) References Cited

U.S. PATENT DOCUMENTS

| | | | | |
|---|---|---|---|---|
| 2004/0125877 | A1* | 7/2004 | Chang | G06F 17/30787 |
| | | | | 375/240.28 |
| 2004/0255249 | A1* | 12/2004 | Chang | G06F 17/30796 |
| | | | | 715/723 |
| 2008/0175486 | A1* | 7/2008 | Yamamoto | G06F 17/30796 |
| | | | | 382/206 |
| 2012/0214575 | A1* | 8/2012 | Amaitis | G06Q 50/34 |
| | | | | 463/25 |
| 2015/0229980 | A1* | 8/2015 | Reisner | H04N 21/26233 |
| | | | | 725/32 |
| 2016/0066062 | A1* | 3/2016 | Oguchi | H04N 21/8133 |
| | | | | 725/93 |

FOREIGN PATENT DOCUMENTS

| | | |
|---|---|---|
| JP | 2005-295296 | 10/2005 |
| JP | 2007-274400 | 10/2007 |
| JP | 2007-335984 | 12/2007 |
| JP | 2008-176538 | 7/2008 |

OTHER PUBLICATIONS

Espacenet English Abstract of Japanese Publication No. 2005-269015, Published Sep. 29, 2005.
Espacenet English Abstract of Japanese Publication No. 2007-274400, Published Oct. 18, 2007.
Korean Office Action dated Jun. 21, 2016 in corresponding Korean Patent Application No. 10-2015-0119681.
Patent Abstracts of Japan, Publication No. 2005-295296, published Oct. 20, 2005.
Patent Abstracts of Japan, Publication No. 2007-335984, published Dec. 27, 2007.
Patent Abstracts of Japan, Publication No. 2008-176538, published Jul. 31, 2008.
Yaji et al., "Automatic Summary Generation of Baseball Games by Using Telop Information", Proceedings of Workshop of the Institute Image Information and Television Engineers, Japan, Institute of Image Information and Television Engineers, Nov. 24, 2005, vol. 29, No. 70, pp. 29-34.
Japanese Office Action dated Mar. 20, 2018 in related Japanese Patent Application No. 2014-173149.

* cited by examiner

FIG. 5

| FRAME TIME(s) | COMPOSITION DETERMINATION | BALL | STRIKE | OUT | RUNNER | SCORE |
|---|---|---|---|---|---|---|
| ... | ... | ... | ... | ... | ... | ... |
| 128.1 |  | 0 | 0 | 1 | 0 | 0-0 |
| 128.2 |  | 0 | 0 | 1 | 0 | 0-0 |
| 128.3 | TRUE | 0 | 0 | 1 | 0 | 0-0 |
| 128.4 | TRUE | 0 | 0 | 1 | 0 | 0-0 |
| 128.5 | TRUE | 0 | 0 | 1 | 0 | 0-0 |
| 128.6 | TRUE | 0 | 0 | 1 | 0 | 0-0 |
| 128.7 | TRUE | 0 | 0 | 1 | 0 | 0-0 |
| 128.8 | TRUE | 0 | 0 | 1 | 0 | 0-0 |
| 128.9 | TRUE | 0 | 0 | 1 | 0 | 0-0 |
| 129.0 | TRUE | 0 | 0 | 1 | 0 | 0-0 |
| 129.1 | TRUE | 0 | 0 | 1 | 0 | 0-0 |
| 129.2 | TRUE | 0 | 0 | 1 | 0 | 0-0 |
| 129.3 | TRUE | 0 | 0 | 1 | 0 | 0-0 |
| 129.4 | TRUE | 0 | 1 | 1 | 0 | 0-0 |
| 129.5 | TRUE | 0 | 1 | 1 | 0 | 0-0 |
| 129.6 | TRUE | 0 | 1 | 1 | 0 | 0-0 |
| 129.7 | TRUE | 0 | 1 | 1 | 0 | 0-0 |
| 129.8 | TRUE | 0 | 1 | 1 | 0 | 0-0 |
| 130.0 | TRUE | 0 | 1 | 1 | 0 | 0-0 |
| 130.1 |  | 0 | 1 | 1 | 0 | 0-0 |
| 130.2 |  | 0 | 1 | 1 | 0 | 0-0 |
| 130.3 |  | 0 | 1 | 1 | 0 | 0-0 |
| ... | ... | ... | ... | ... | ... | ... |

START OF PITCH

CHANGE IN COUNT INFORMATION DETECTED

PITCHING COMPOSITION SCENE

FIG. 6

| FRAME TIME(s) | COMPOSITION DETERMINATION | BALL | STRIKE | OUT | RUNNER | SCORE |
|---|---|---|---|---|---|---|
| ... | ... | ... | ... | ... | ... | ... |
| 128.1 | TRUE | 0 | 0 | 1 | 0 | 0-0 |
| 128.2 | TRUE | 0 | 0 | 1 | 0 | 0-0 |
| 128.3 | TRUE | 0 | 0 | 1 | 0 | 0-0 |
| 128.4 | TRUE | 0 | 0 | 1 | 0 | 0-0 |
| 128.5 | TRUE | 0 | 0 | 1 | 0 | 0-0 |
| 128.6 | TRUE | 0 | 0 | 1 | 0 | 0-0 |
| 128.7 | TRUE | 0 | 0 | 1 | 0 | 0-0 |
| ... | ... | ... | ... | ... | ... | ... |
| 130.5 | TRUE | 0 | 0 | 1 | 0 | 0-0 |
| 130.6 | TRUE | 0 | 0 | 1 | 0 | 0-0 |
| 130.7 |  | 0 | 0 | 1 | 0 | 0-0 |
| 130.8 |  | 0 | 0 | 1 | 0 | 0-0 |
| 130.9 |  | 0 | 0 | 1 | 0 | 0-0 |
| 131.0 |  | 0 | 0 | 1 | 0 | 0-0 |
| 131.1 | TRUE | 0 | 1 | 1 | 0 | 0-0 |
| 131.2 | TRUE | 0 | 1 | 1 | 0 | 0-0 |
| 131.3 | TRUE | 0 | 1 | 1 | 0 | 0-0 |
| 131.4 | TRUE | 0 | 1 | 1 | 0 | 0-0 |
| 131.5 | TRUE | 0 | 1 | 1 | 0 | 0-0 |
| 131.6 | TRUE | 0 | 1 | 1 | 0 | 0-0 |
| 131.7 | TRUE | 0 | 1 | 1 | 0 | 0-0 |
| 131.8 | TRUE | 0 | 1 | 1 | 0 | 0-0 |
| ... | ... | ... | ... | ... | ... | ... |

START OF PITCH

CHANGE IN COUNT INFORMATION DETECTED

PITCHING COMPOSITION SCENE SUBJECT TO DETERMINATION

NEXT PITCHING COMPOSITION SCENE

FIG. 7

| FRAME TIME(s) | COMPOSITION DETERMINATION | BALL | STRIKE | OUT | RUNNER | SCORE |
|---|---|---|---|---|---|---|
| ... | | ... | ... | ... | ... | ... |
| 128.1 | | 0 | 0 | 1 | 0 | 0-0 |
| 128.2 | | 0 | 0 | 1 | 0 | 0-0 |
| 128.3 | TRUE | 0 | 0 | 1 | 0 | 0-0 |
| 128.4 | TRUE | 0 | 0 | 1 | 0 | 0-0 |
| 128.5 | TRUE | 0 | 0 | 1 | 0 | 0-0 |
| 128.6 | TRUE | 0 | 0 | 1 | 0 | 0-0 |
| 128.7 | TRUE | 0 | 0 | 1 | 0 | 0-0 |
| ... | ... | ... | ... | ... | ... | ... |
| 130.5 | TRUE | 0 | 0 | 1 | 0 | 0-0 |
| 130.6 | TRUE | 0 | 0 | 1 | 0 | 0-0 |
| 130.7 | | 0 | 0 | 1 | 0 | 0-0 |
| 130.8 | | 0 | 0 | 1 | 0 | 0-0 |
| 130.9 | | 0 | 0 | 1 | 0 | 0-0 |
| 131.0 | | 0 | 0 | 1 | 0 | 0-0 |
| 131.1 | TRUE | 0 | 0 | 1 | 0 | 0-0 |
| 131.2 | TRUE | 0 | 0 | 1 | 0 | 0-0 |
| 131.3 | TRUE | 0 | 0 | 1 | 0 | 0-0 |
| 131.4 | TRUE | 0 | 0 | 1 | 0 | 0-0 |
| 131.5 | TRUE | 0 | 0 | 1 | 0 | 0-0 |
| 131.6 | TRUE | 0 | 0 | 1 | 0 | 0-0 |
| 131.7 | TRUE | 0 | 0 | 1 | 0 | 0-0 |
| 131.8 | TRUE | 0 | 0 | 1 | 0 | 0-0 |
| ... | ... | ... | ... | ... | ... | ... |

26

NO CHANGE IN COUNT INFORMATION

NO CHANGE IN COUNT INFORMATION

PITCHING COMPOSITION SCENE SUBJECT TO DETERMINATION

NEXT PITCHING COMPOSITION SCENE

FIG. 9

| | BALL | STRIKE | OUT | RUNNER |
|---|---|---|---|---|
| COUNT BEFORE CHANGE | 0 | 0 | 1 | 0 |
| COUNT AFTER CHANGE | 0 | 1 | 1 | 0 |

PITCH RESULT IS "STRIKE"

FIG. 10

| FRAME TIME | PITCH | PITCH RESULT |
|---|---|---|
| ... | ... | ... |
| 128.3 | START OF PITCH | STRIKE |
| 147.5 | START OF PITCH | BALL |
| ... | ... | ... |

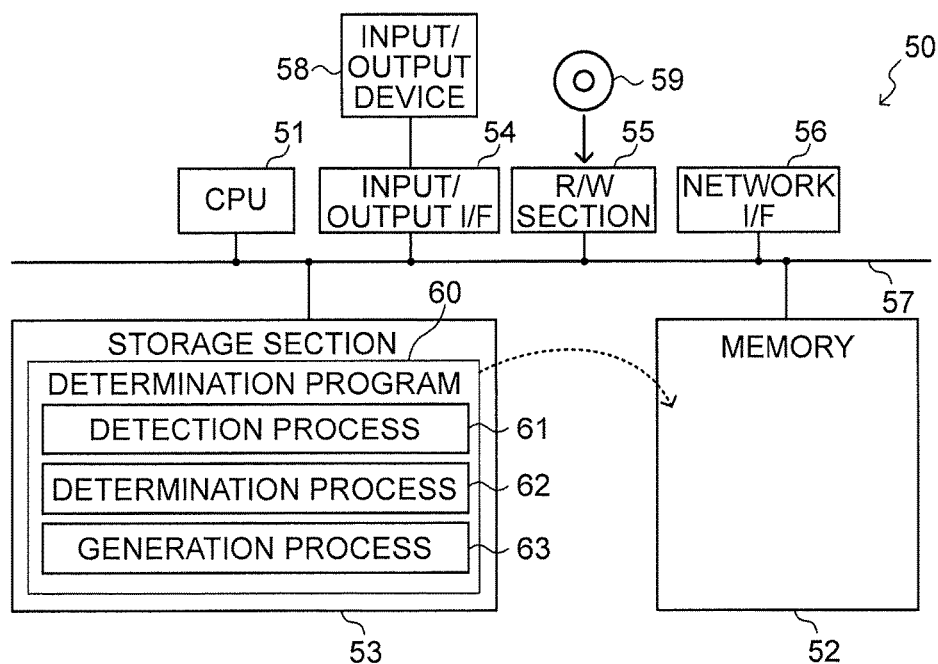
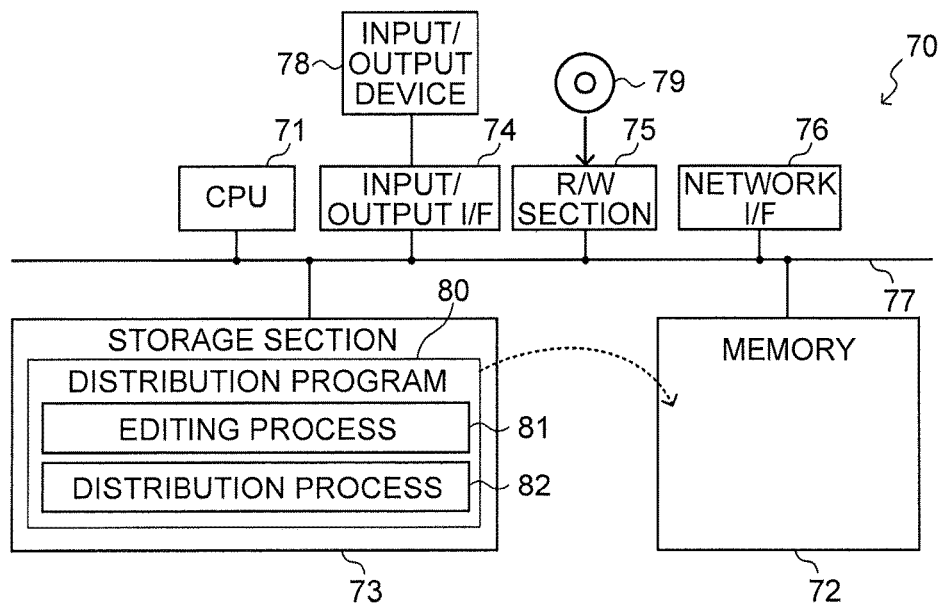

FIG. 18

| FRAME TIME(s) | COMPOSITION DETERMINATION | BALL | STRIKE | OUT | RUNNER | SCORE |
|---|---|---|---|---|---|---|
| ... | ... | ... | ... | ... | ... | ... |
| 128.1 | | 0 | 0 | 1 | 0 | 0-0 |
| 128.2 | | 0 | 0 | 1 | 0 | 0-0 |
| 128.3 | TRUE | 0 | 0 | 1 | 0 | 0-0 |
| 128.4 | TRUE | 0 | 0 | 1 | 0 | 0-0 |
| 128.5 | TRUE | 0 | 0 | 1 | 0 | 0-0 |
| 128.6 | TRUE | 0 | 0 | 1 | 0 | 0-0 |
| 128.7 | TRUE | 0 | 0 | 1 | 0 | 0-0 |
| 128.8 | TRUE | 0 | 0 | 1 | 0 | 0-0 |
| 128.9 | TRUE | 0 | 0 | 1 | 0 | 0-0 |
| 129.0 | TRUE | 0 | 0 | 1 | 0 | 0-0 |
| 129.1 | TRUE | 0 | | | 0 | 0-0 |
| 129.2 | TRUE | 0 | | | 0 | 0-0 |
| 129.3 | TRUE | 0 | | | 0 | 0-0 |
| 129.4 | TRUE | 0 | | | 0 | 0-0 |
| 129.5 | TRUE | 0 | 1 | 1 | 0 | 0-0 |
| 129.6 | TRUE | 0 | 1 | 1 | 0 | 0-0 |
| 129.7 | TRUE | 0 | 1 | 1 | 0 | 0-0 |
| 129.8 | TRUE | 0 | 1 | 1 | 0 | 0-0 |
| 130.0 | TRUE | 0 | 1 | 1 | 0 | 0-0 |
| 130.1 | | 0 | 1 | 1 | 0 | 0-0 |
| 130.2 | | 0 | 1 | 1 | 0 | 0-0 |
| 130.3 | | 0 | 1 | 1 | 0 | 0-0 |
| ... | ... | ... | ... | ... | ... | ... |

START OF PITCH

CHANGE IN COUNT INFORMATION DETECTED

PITCHING COMPOSITION SCENE

DETERMINATION METHOD AND DEVICE

CROSS-REFERENCE TO RELATED APPLICATION

This application is based upon and claims the benefit of priority of the prior Japanese Patent Application No. 2014-173149, filed on Aug. 27, 2014, the entire contents of which are incorporated herein by reference.

FIELD

The embodiments discussed herein are related to a recording medium storing a determination program, a determination method, and a determination device.

BACKGROUND

Known services exist in which captured baseball game footage is distributed live, and distributed as video-on-demand (VoD) content. During distribution as VoD content, for example, the viewer selects a desired inning, which is then presented to the viewer in a viewable form. In order to present such VoD content, footage is manually extracted for each inning.

Technology has been proposed to extract highlight scenes from captured baseball game footage.

RELATED PATENT DOCUMENTS

Japanese Laid-Open Patent Publication No. 2005-295296

SUMMARY

According to an aspect of the embodiments, a non-transitory recording medium storing a determination program causes a computer to execute a process. The process includes, from captured footage of a baseball game including plural frames stored in a storage section, determining plural consecutive frames, which each have a specific characteristic and in which a change is detected in a ball count number, an out count number, or a runner number acquired from image information representing a game situation, to be a pitching scene.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for explaining determination of frames representing the start of a pitch;

FIG. 6 is a diagram for explaining determination of frames representing the start of a pitch;

FIG. 7 is a diagram for explaining cases in which the start frame of a pitching composition scene is not determined as a frame representing the start of a pitch;

FIG. 9 is a diagram for explaining determination of a pitch result;

FIG. 10 is a diagram illustrating an example of a metadata file;

FIG. 11 is a schematic block diagram illustrating an example of a computer that functions as a determination device;

FIG. 12 is a schematic block diagram illustrating an example of a computer that functions as a distribution device;

FIG. 18 is a diagram for explaining detection of change in count information when effects are applied to a count display.

DESCRIPTION OF EMBODIMENTS

An example of an exemplary embodiment according to the technology disclosed herein is explained in detail below with reference to the drawings. In the present exemplary embodiment, explanation is given regarding an example of a determination device according to the technology disclosed herein applied to a footage distribution system.

Figure 1:
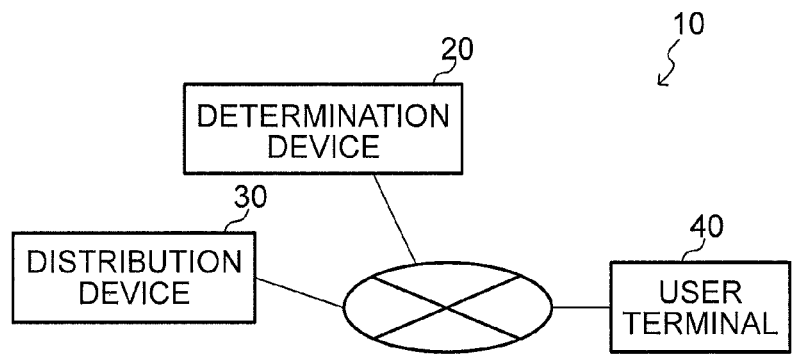
FIG. 1 is a block diagram illustrating a schematic configuration of a footage distribution system according to an exemplary embodiment.

As illustrated in FIG. 1, a footage distribution system 10 according to the present exemplary embodiment includes a determination device 20, a distribution device 30, and a user terminal 40. The determination device 20, the distribution device 30, and the user terminal 40 are connected to one another through a network.

The user terminal 40 is a device provided with a display section that displays footage, and an input section to which information is input, and the user terminal 40 is, for example, a personal computer (PC), a notebook PC, a tablet terminal, or a smartphone. Although only one user terminal 4Q is illustrated in FIG. 1, there may be plural user terminals.

Figure 2:
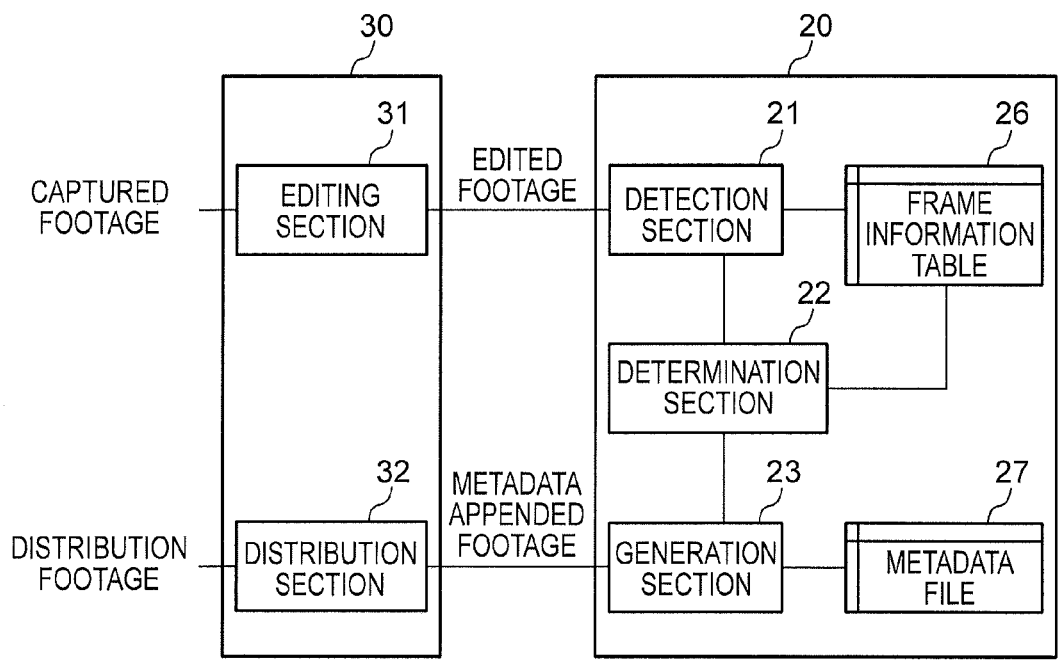
FIG. 2 is a functional block diagram of a determination device and a distribution device according to the exemplary embodiment.

In the footage distribution system 10, metadata related to pitching scenes generated by the determination device 20 are added to footage, and sent to the user terminal 40 over the network by the distribution device 30. As illustrated in FIG. 2, the determination device 20 includes a detection section 21, a determination section 22, and a generation section 23. The distribution device 30 includes an editing section 31 and a distribution section 32.

First, detailed explanation is given regarding individual sections of the distribution device 30.

The editing section 31 acquires footage capturing a baseball game (referred to as "captured footage" hereafter). The captured footage is footage captured at a frame rate such as 30 fps, or 60 fps, and includes plural frames. Each frame is associated with a frame time indicating an elapsed time since the start of capture of the captured footage. In the present exemplary embodiment, frame times are employed as identification information of frames.

Figure 3:
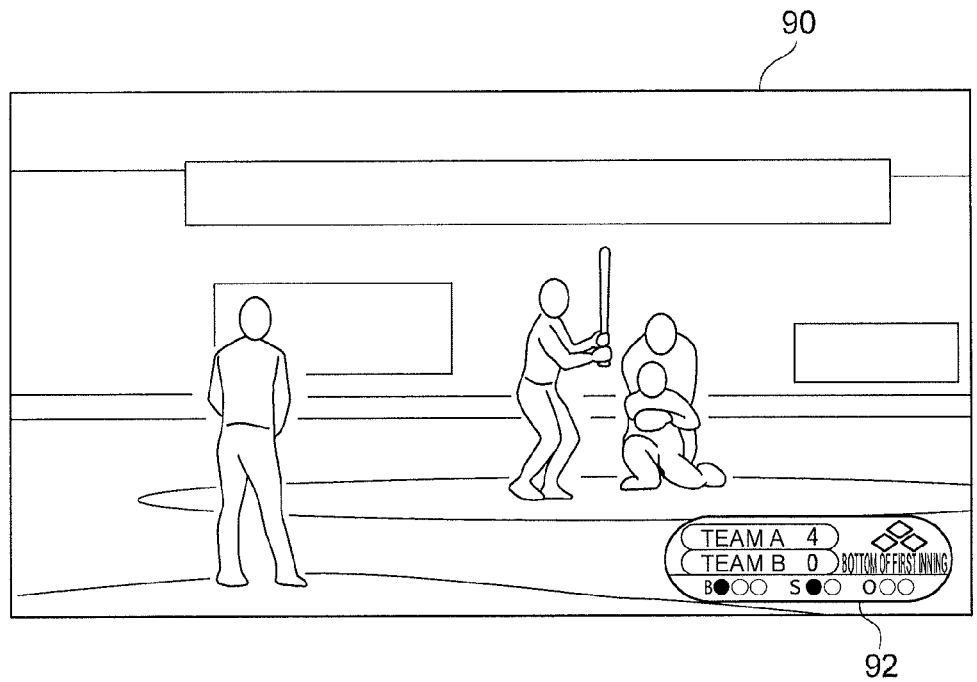
FIG. 3 is a diagram for explaining examples of a pitching composition frame and editing.

The editing section 31 applies editing commands, designated by operation of an operator using a display device and input device, not illustrated in the drawings, to the captured footage using image processing. As illustrated in FIG. 3, for example, the editing commands include adding a count display 92 that displays the game state to each frame 90 corresponding to specified scenes in the captured footage.

Figure 4:
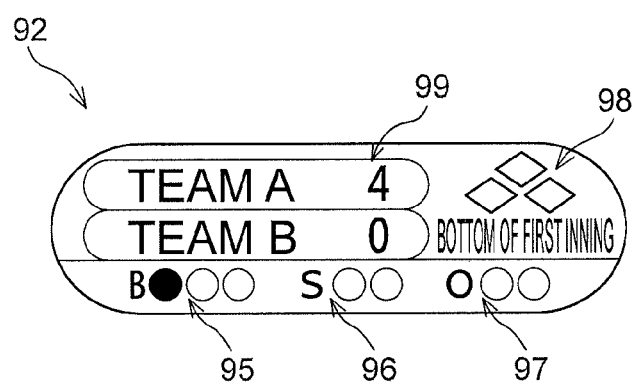
FIG. 4 is a diagram illustrating an example of a count display.

The count display 92 is a display that displays count information including a ball count, a strike count, an out count, a runner situation, and the current score for each team. For example, as illustrated in FIG. 4, the count display 92 includes a ball count display 95 that displays the ball count, a strike count display 96 that displays the strike count. The count display 92 also includes an out count display 97 that displays the out count, a runner display 98 that displays the runner situation, and a score display 99 that displays the current score for each team. Note that the format of the count display 92 is not limited to the example in FIG. 4; any display displaying count information including the ball count, strike count, out count, runner situation, and current score for each team is sufficient.

The editing commands are not limited to adding the count display 92, and may include various content such as adding an overlay displaying player information such as name and profile. Footage that is captured footage that has been edited by the editing section 31 is referred to as "edited footage" hereafter. The editing section 31 transmits the edited footage to the determination device 20.

The distribution section 32 acquires footage to which metadata generated by the determination device 20 has been added (referred to as "metadata appended footage" hereafter; detailed explanation is given below). The distribution section 32 converts metadata appended footage to distribution footage according to specified standards, and distributes the distribution footage to a distribution destination user terminal 40.

Next, detailed explanation is given regarding individual sections of the determination device 20.

The detection section 21 acquires edited footage transmitted from the distribution device 30. The detection section 21 detects from respective plural frames included in the edited footage, a frame having a composition captured at a camera angle used in a pitcher's pitching scene, as a pitching composition frame. In the present exemplary embodiment, explanation follows regarding a case in which the pitching composition frame is a frame having a composition captured in a direction toward the batter from behind the pitcher, as illustrated in FIG. 3.

Specifically, the detection section 21 extracts image characteristics for each frame. The image characteristics are characteristics represented by pixel information such as the luminance and color of each pixel inside the frame. The detection section 21 derives a similarity value between reference image characteristics extracted from a pre-prepared pitching composition frame, and extracted image characteristics extracted from each frame of the edited footage. The detection section 21 extracts as pitching composition frames any frames with extracted image characteristics having a similarity value to the reference image characteristics of a specified value or greater.

The detection section 21 may employ, as the image characteristics, characteristics representing image composition (configuration), characteristics representing, for example, color and luminance placement and distribution, characteristics obtained by a wavelet transform, and the like.

When such image characteristics are extracted, these characteristics may be extracted from the whole of each frame, or may be characteristics extracted from a portion of each frame (for example, a ballpark fence, or wall region included in the captured footage). In actual captured footage, even for the same pitching composition frame, some degree of discrepancy can arise in the composition of the image, such as slight variations in camera angle, differences in where players stand, changes to background signboards, and the like. When image characteristics are extracted from the whole of frames, image characteristics can be extracted that suppress the effects of such a degree of discrepancy arising in the composition of the image. However, when image characteristics are extracted from a portion of a frame, image characteristics are extracted from a region that excludes regions in which some variation arises in the composition of the image, such as a region representing a background signboard. Employing image characteristics extracted in this manner enables an increase in precision of similarity determination to be achieved.

Plural types of reference image characteristics may be prepared in consideration of differences in the background of each ballpark, different colors of uniforms worn by players, variation in overlay formats of each broadcaster, and the like. In such cases, the detection section 21 may acquire information such as the ballpark, the teams, and the broadcaster, together with the edited footage, and may select and use the reference image characteristics in accordance with the acquired information. Regarding variation in camera angle, it is conceivable that variations in camera angle and image characteristics may arise depending on the dominant hand of the pitcher or batter. Accordingly, reference image characteristics may be prepared for different pitcher and batter dominant hands. For example, the four patterns may be prepared: pitcher throwing left-handed and batter batting left-handed; pitcher throwing left-handed and batter batting right-handed; pitcher throwing right-handed and batter batting left-handed; and pitcher throwing right-handed and batter batting right-handed. Then, the pitching composition frames may be extracted when one of the prepared reference image characteristics is matched.

The detection section 21 extracts the count display 92 from each frame, and detects count information displayed by the count display 92. For example, the detection section 21 extracts the count display 92 from a region within a frame predetermined to be a region displaying the count display 92. Alternatively, the count display 92 is extracted from within the frame by, for example, pattern matching using a predetermined format for the count display 92. The detection section 21 then identifies the region of the ball count display 95 in the extracted count display 92 using, for example, pattern matching or optical character recognition processing, and detects the ball count displayed by the ball count display 95. Similarly, the detection section 21 detects the strike count in the strike count display 96, detects the out count in the out count display 97, detects the runner situation in the runner display 98, and detects the scores in the score display 99.

The detection section 21 records the detection results of the pitching composition frames and the count information detected for each of the frames in a frame information table 26. FIG. 5 illustrates an example of the frame information table 26. In the example of FIG. 5, "composition determination", "ball", "strike", "out", "runner", and "score" items are included for each frame identified by a frame time. The detection section 21 records "TRUE" in the "composition determination" item corresponding to frames detected as pitching composition frames. The "composition determination" item is left blank for frames not detected as pitching composition frames. The detection section 21 records the ball count, the strike count, the out count, the runner situation, and the scores detected as count information in the "ball", "strike", "out", "runner", and "score" items, respectively.

In FIG. 5, and in FIG. 6 and FIG. 7, which are described later, the frame time is displayed in 0.1 second divisions in order to simplify explanation. However, in the case of captured footage with a framerate of 30 fps for example, the frame times are in divisions of approximately 0.03 seconds. In the case of captured footage with a framerate of 60 fps, the frame times are in divisions of approximately 0.017 seconds.

The determination section 22 references the frame information table 26 recorded by the detection section 21, and identifies groups of frames formed from plural consecutive pitching composition frames as pitching composition scenes. The determination section 22 also determines whether or not the count information changed between the any of the frames included in the pitching composition scene. In cases in which the count information changed, the determination section 22 determines that the pitching composition scene represents a pitch by a pitcher, and the start frame of the pitching composition scene (the leading frame) is determined as a frame representing the start of a pitch.

For example, in the example of FIG. 5, the determination section 22 first identifies a scene represented by the group of frames included at frame times of from 128.3 to 130.0 as a pitching composition scene. The strike count changes in this pitching composition scene between the frame at frame time=129.4 and the frame at frame time=129.5. When the change is detected, the determination section 22 determines that the frame at frame time=128.3 that is the start frame of the pitching composition scene is a frame representing the start of a pitch.

Regarding determination of the change in the count information, the determination may be performed for each frame in a group of frames identified as a pitching composition scene, or the determination may be performed selectively for a portion sampled from the group of frames identified as the pitching composition scene. In cases in which the count information changes in a pitching composition scene, the count information changes between the start frame and the final frame (the last frame) of the group of frames identified as a pitching composition scene. Change in the count information may therefore be determined by comparing the start frame with the final frame. In cases in which a change in the count information is determined by comparing the start frame with the final frame, determination can be made as to whether or not a pitch was made in the pitching composition scene using two frames worth of determination.

In the above determination method, in cases in which the camera angle was changed before the count display 92 changed, namely, cases in which the footage stopped being a pitching composition scene, the start of the pitch is unable to be determined even though the pitcher has thrown a pitch. For example, although the strike count display 96 changes when a batter bats a foul ball up to two strikes, transition is often made to a camera angle tracking the whereabouts of a batted ball before the strike count display 96 changes. In such cases, the start of the pitch is not determinable by the above determination method since the change in the strike count does not appear in a pitching composition scene.

In cases in which the batter makes a batting, at least one out of the out count, the runner situation, and the score will change depending on whether the result was an out or a hit. However, in such cases there is a high probability that the camera angle will change to track the whereabouts of a batted ball or a base runner before either of the out count display 97, the runner display 98, and the score display 99 change. The start of a pitch is not determinable by the above determination method in such cases too.

The ball count display 95 or the strike count display 96 changes when the result of the pitch is a ball or a strike. However, when the ball is thrown to one of the bases immediately after a catch by a catcher, there is a high probability that the camera angle will change to capture the vicinity of the base that the ball was thrown to by the catcher before the ball count display 95 or the strike count display 96 changes. The start of a pitch is not determinable by the above determination method in such cases too.

The determination section 22 therefore compares the count information of the final frame of the pitching composition scene subject to determination against the start frame of the next pitching composition scene in cases in which a change in the count information was not detected within the pitching composition scene subject to determination. The determination section 22 determines that the start frame of the pitching composition scene subject to determination is a frame representing the start of a pitch in cases in which change is detected in the count information between both frames. Given that the count display 92 does not change immediately, the frame compared against the final frame of the pitching composition scene subject to determination may be a frame a specific number of frames after the start frame of the next pitching composition scene.

For example, in the frame information table 26 illustrated in FIG. 6, the group of frames including frames times of from 128.3 to 130.6 are identified as a pitching composition scene subject to determination. The group of frames from frame time of 131.1 onward are identified as the next pitching composition scene to the pitching composition scene subject to determination. Change in the count information is not detected between frames in the pitching composition scene subject to determination. The determination section 22 therefore compares count information of the frame at frame time 130.6 that is the final frame of the pitching composition scene subject to determination and the frame at frame time 131.1 that is the start frame of the next pitching composition scene. Since the strike count changes between the two frames, the determination section 22 determines that the frame at frame time=128.3 that is the start frame of the pitching composition scene subject to determination is a frame representing the start of a pitch.

Namely, as illustrated in FIG. 7, the start frame of the pitching composition scene is not determined as a frame representing the start of a pitch when none of the above determination methods have detected a change in the count information. This occurs when the camera angle has changed before a pitch is delivered by a pitcher, namely, when the pitching composition scene is interrupted temporarily.

Figure 8:
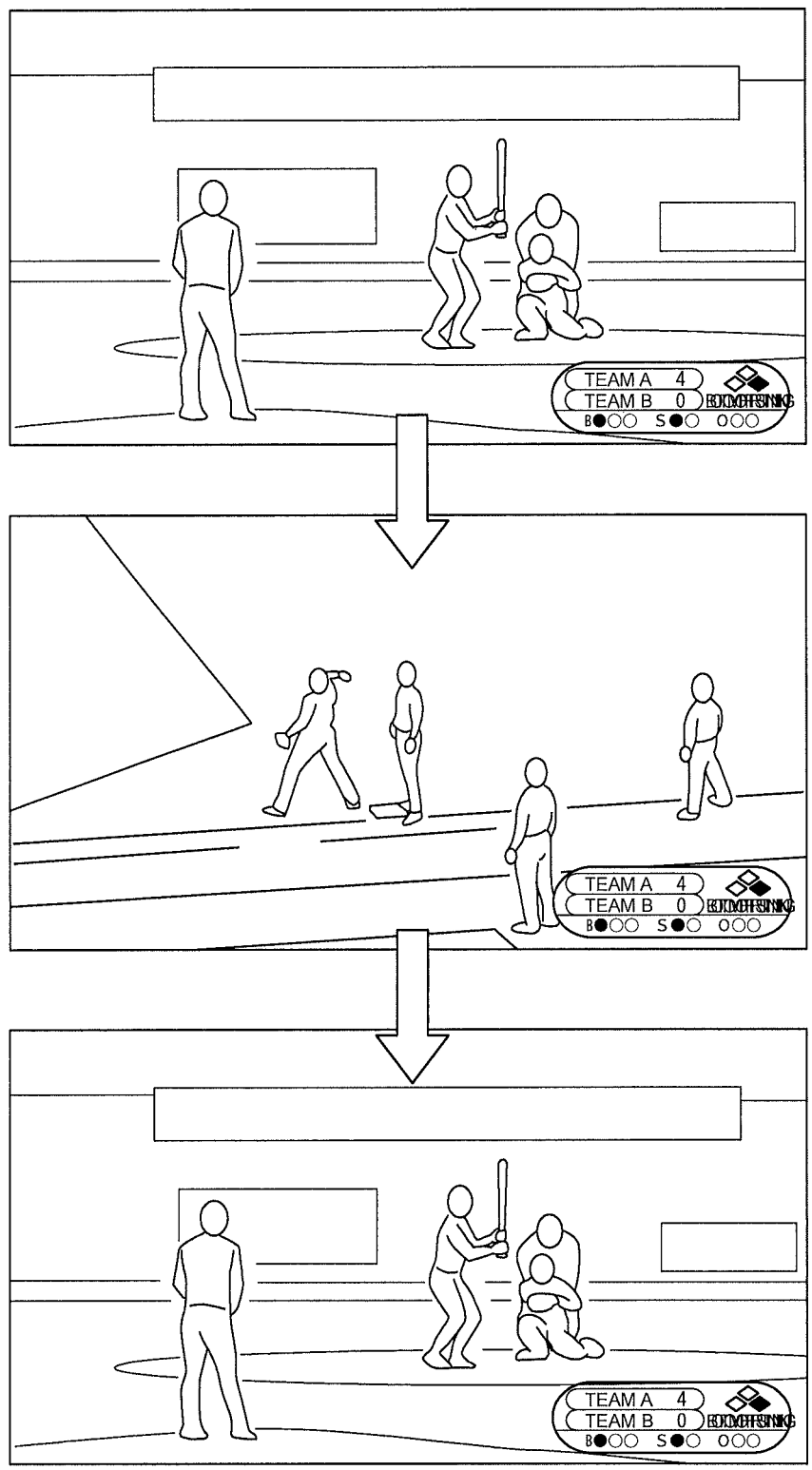
FIG. 8 is a diagram for explaining a pickoff scene.

Examples of such situations include cases in which a pitcher throws a pickoff. In such cases, as illustrated in FIG. 8 for example, the scenes transition between the pitching composition scene (the top of FIG. 8), a scene of the vicinity of the base at the pickoff target (the center of FIG. 8), and the scene of the next pitching composition scene (the bottom of FIG. 8). In such cases, although the pitching composition scene is interrupted before the pitcher delivers the pitch, the start frame of that pitching composition scene is not determined as a frame representing the start of a pitch since no change is detected in the count information.

Similarly, for example, after the pitcher has assumed a pitching stance there tends to be a transition from the pitching composition scene to a scene such as close-up of the pitcher in cases in which the plate is temporarily left, or the like. In such cases, similarly to the case of a pickoff, although the pitching composition scene is interrupted before the pitcher delivers the pitch, the start frame of that pitching composition scene is not determined as a frame representing the start of a pitch since no change is detected in the count information.

When only pitching scenes are wanted for extraction, scenes such pickoff scenes, scenes where the pitcher leaves the plate, and the like, are referred to as noise. In the present exemplary embodiment, frames representing the start of a pitch are determined using changes in the count information as described above. This enables the start of a pitch to be determined while filtering out scenes that would be unfilterable noise if simply determining the start frames of pitching composition scenes to be the frames indicating the start of pitches.

When any of the count information is not detected in all of the frames included in a pitching composition scene, the determination section 22 determines that that pitching composition scene is a replay, and the start frame of the pitching composition scene is not determined as a frame representing the start of a pitch. Note that the present exemplary embodiment utilizes the fact that the count display 92 is not displayed during replays, and it is therefore not determinable whether or not a scene is a replay based on the count information recorded in the frame information table 26. Note that the replay determination method is not limited to this method, and special processing such as a mark to indicate a replay, such as "Replay" or "VTR", or a decorative border may be detected in frames separately to the count information to determine whether or not the frame is a replay.

When a change in the count information is detected in a pitching composition scene or in the start frame of the next pitching composition scene, the determination section 22 determines the pitching result based on the change in the count information as illustrated in FIG. 9. For example, in the case of FIG. 5, the strike count increased by 1 between the count information of the frame at frame time=129.4 and the count information of the frame at frame time 129.5. The determination section 22 accordingly determines that "strike" is the pitching result of the pitching scene starting from the frame at frame time 128.3 that was determined to be the start of the pitch.

Similarly, in the case of FIG. 6, the strike count increases by 1 between the count information of the frame at frame time=130.6 and the count information of the frame at frame time 131.1. The determination section 22 accordingly determines that "strike" is the pitching result of the pitching scene starting from the frame at frame time 128.3 determined to be the start of the pitch.

The generation section 23 generates metadata related to the pitching scene based on the determination result made by the determination section 22. Specifically, the generation section 23 generates metadata associating the information indicating the start of the pitch at the frame time of the frame representing the start of the pitch determined by the determination section 22, and the information of the pitch result determined for the pitching scene starting from that frame.

The generation section 23 generates metadata for each frame determined to be a frame representing the start of a pitch by the determination section 22.

The generation section 23 generates a metadata file 27 recorded with the plural generated metadata in the sequence of the frame time included in the metadata. The metadata file 27 may be generated as a file formatted as, for example, a comma-separated values (csv) file. An example of the metadata file 27 is illustrated in FIG. 10. In the example of FIG. 10, each row represents a single item of metadata, and the "pitch" item is information indicating the start of the pitch, and the "pitch result" item is information indicating the pitch result.

Although explanation is given here regarding a case in which metadata is generated using frame times, metadata may be generated using other information for identifying respective frames, such as frame numbers.

The generation section 23 appends the generated metadata file 27 to the edited footage, and transmits the metadata appended footage to the distribution device 30.

The determination device 20 may, for example, be implemented by the computer 50 illustrated in FIG. 11. The computer 50 includes a CPU 51, memory 52 serving as a temporary storage region, and a nonvolatile storage section 53. The computer 50 also includes an input/output interface (I/F) 54 connected to an input/output device 58 such as a display device or an input device. The computer 50 also includes a read/write (R/W) section 55 that controls reading and writing of data from and to a recording medium 59, and a network I/F 56 for connecting to a network such as the internet. The CPU 51, the memory 52, the storage section 53, the input/output I/F 54, the R/W section 55, and the network I/F 56 are connected to one another through a bus 57.

The storage section 53 may be implemented by a hard disk drive (HDD), solid state drive (SSD), flash memory, or the like. The storage section 53, serving as a storage medium, is stored with a determination program 60 that causes the computer 50 to function as the determination device 20. The CPU 51 reads the determination program 60 from the storage section 53, expands the determination program 60 into the memory 52, and sequentially executes processes of the determination program 60.

The determination program 60 includes a detection process 61, a determination process 62, and a generation process 63. The CPU 51 operates as the detection section 21 illustrated in FIG. 2 by executing the detection process 61. The CPU 51 operates as the determination section 22 illustrated in FIG. 2 by executing the determination process 62. The CPU 51 operates as the generation section 23 illustrated in FIG. 2 by executing the generation process 63. The computer 50 that executes the determination program 60 thereby functions as the determination device 20.

The distribution device 30 may be implemented by, for example, a computer 70 illustrated in FIG. 12. The computer 70 includes a CPU 71, memory 72, a nonvolatile storage section 73, and an input/output I/F 74 connected to an input/output device 78. The computer 70 also includes an R/W section 75 that controls reading and writing of data to and from a recording medium 79, and a network I/F 76 for connecting to a network such as the internet. The CPU 71, the memory 72, the storage section 73, the input/output I/F 74, the R/W section 75, and the network I/F 76 are connected to one another through a bus 77.

The computer 70 that implements the distribution device 30 and the computer 50 that implements the determination device 20 are connected through the network I/F 76 of the computer 70, the network, and the network I/F 56 of the computer 50.

The storage section 73 may be implemented by a HDD, an SSD, flash memory, or the like. The storage section 73, serving as a storage medium, is stored with a distribution program 80 that causes the computer 70 to function as the distribution device 30. The CPU 71 reads the distribution program 80 from the storage section 73, expands the distribution program 80 into the memory 72, and sequentially executes processes included in the distribution program 80.

The distribution program 80 includes an editing process 81, and a distribution process 82. The CPU 71 operates as the editing section 31 illustrated in FIG. 2 by executing the editing process 81. Moreover, the CPU 71 operates as the distribution section 32 illustrated in FIG. 2 by executing the distribution process 82. Thus the computer 70 executing the distribution program 80 functions as the distribution device 30.

Note that the determination device 20 and the distribution device 30 can respectively be implemented by, for example, a semiconductor integrated circuit, more specifically, by an application specific integrated circuit (ASIC), or the like.

Next, explanation is given regarding operation of the footage distribution system 10 according to the present exemplary embodiment. When the captured footage is input to the distribution device 30, the distribution device 30 executes editing processing illustrated in FIG. 13, and outputs the edited footage. Next, when the edited footage is input to the determination device 20, the determination device 20 executes determination processing illustrated in FIG. 14, and outputs the metadata appended footage. Then, when the metadata appended footage is input to the distribution device 30, the distribution device 30 executes distribution processing illustrated in FIG. 16, and outputs the distribution footage. Each processing is described in detail below.

Figure 13:
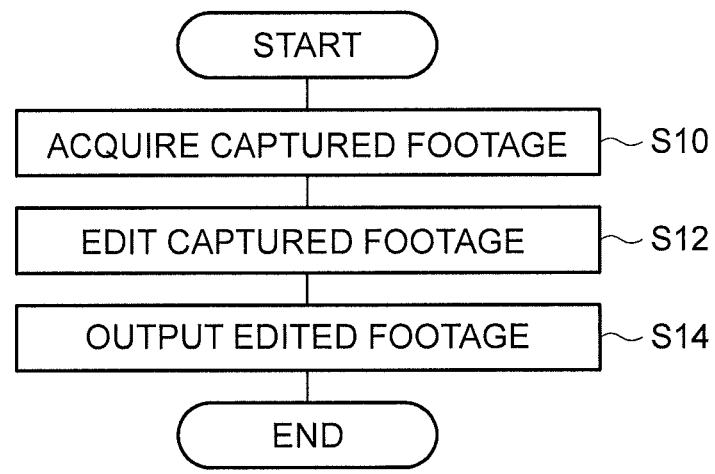
FIG. 13 is a flowchart illustrating an example of editing processing.

First, at step S10 of the editing processing illustrated in FIG. 13, the editing section 31 acquires the captured footage. Next, at step S12, the editing section 31 applies editing commands, designated by the operation of an operator using the input/output device 78, to the captured footage using image processing. Next, at step S14, the editing section 31 transmits the edited footage to the determination device 20, and the editing processing ends.

Figure 14:
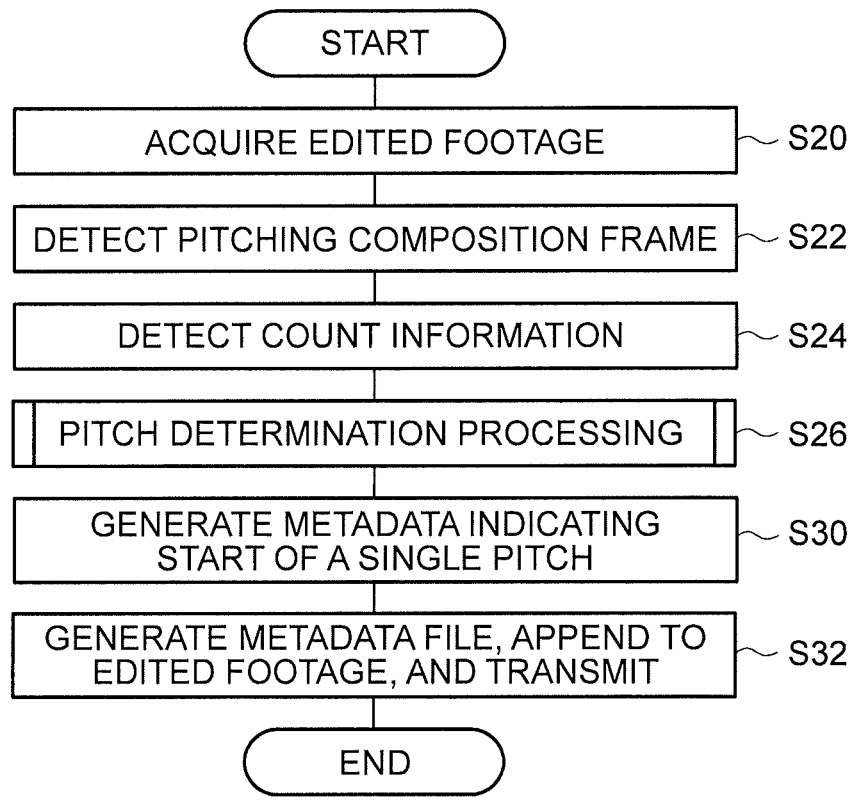
FIG. 14 is a flowchart illustrating an example of determination processing.

Next, at step S20 of the determination processing illustrated in FIG. 14, the detection section 21 acquires the edited footage transmitted from the distribution device 30.

Next, at step S22, the detection section 21 detects pitching composition frames from each of plural frames included in the edited footage. Specifically, the detection section 21 extracts extracted image characteristics from each of the plural frames included in the edited footage. Then, the detection section 21 derives the similarity value between the pre-prepared reference image characteristics and the extracted image characteristics, and frames with extracted image characteristics having a similarity value to the reference image characteristics of the specified value or greater are extracted as pitching composition frames.

Next, at step S24, the detection section 21 extracts the count display 92 from each from using pattern matching or the like. Then, the detection section 21 identifies the ball count display 95, the strike count display 96, the out count display 97, the runner display 98, and the score display 99 included in the extracted count display 92, using pattern matching, optical character recognition processing, or the like. The detection section 21 detects the ball count, the strike count, the out count, the runner situation, and the score from each identified display. The detection section 21 records the detection results of the pitching composition frames, and the count information detected for each frame, in the frame information table 26.

Figure 15:
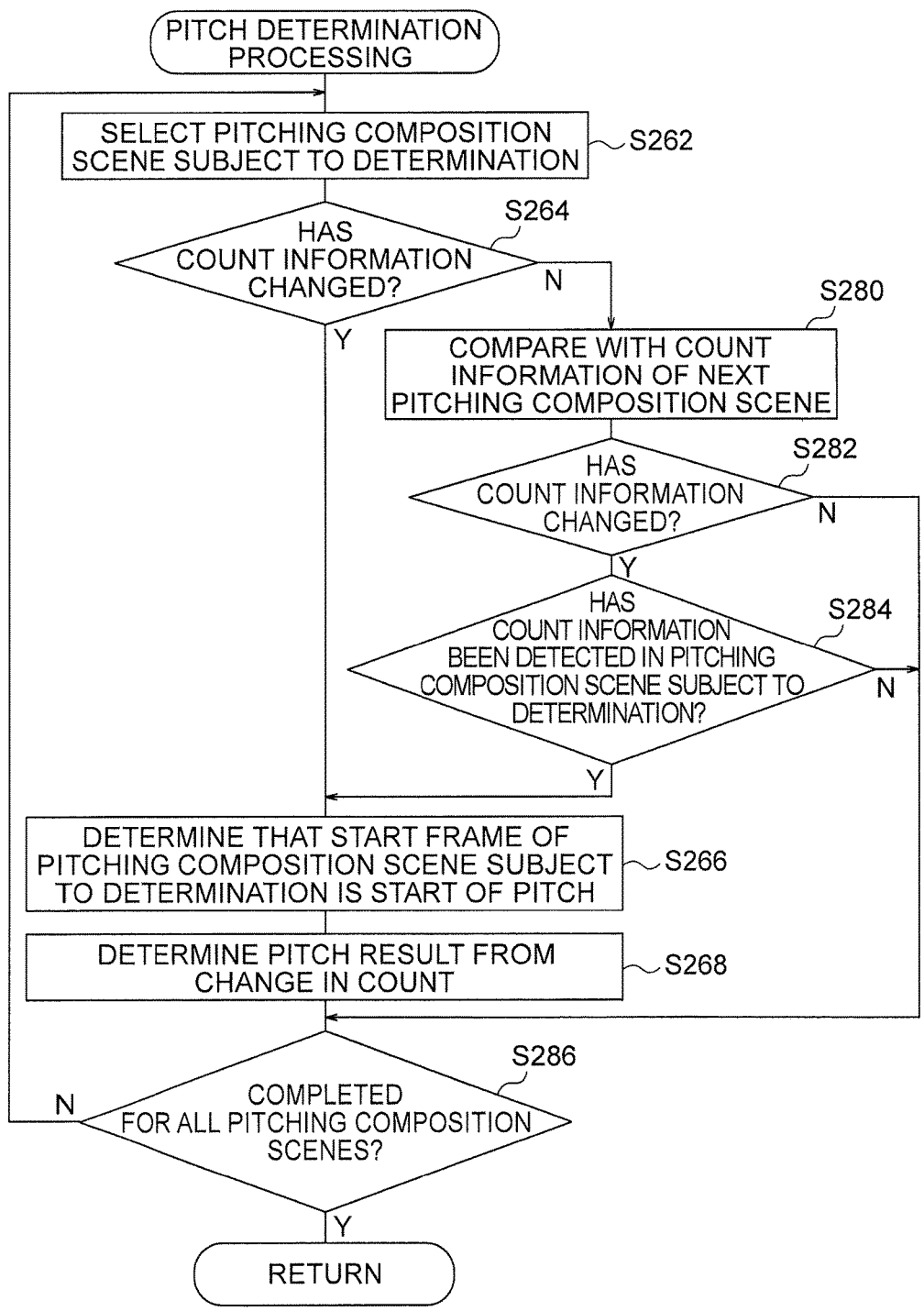
FIG. 15 is a flowchart illustrating an example of pitch determination processing.

Next, at step S26, pitch determination processing, illustrated in detail in FIG. 15, is executed. At step S262 of the pitch determination processing illustrated in FIG. 15, the determination section 22 references the frame information table 26 recorded by the detection section 21, and identifies groups of frames formed from plural consecutive pitching composition frames as pitching composition scenes. The determination section 22 then selects one pitching composition scene as a determination subject.

Next, at step S264, the determination section 22 determines whether or not the count information changes between any of the frames included in the pitching composition scene selected as the determination subject. Processing transitions to step S266 in cases in which the count information changed, and processing transitions to step S280 in cases in which the count information did not change.

At step S266, the determination section 22 determines that the pitching composition scene subject to determination represents a single pitch being delivered by a pitcher, and determines the start frame of the pitching composition scene as a frame representing the start of a pitch.

Next, at step S268, the determination section 22 determines the pitch result of the pitching scene starting from the frame determined as the start of the pitch based on the change in the count information detected in the pitching composition scene subject to determination. For example, the pitch result is determined as "strike" in cases in which the strike count increased by 1 after the change in the count information compared to the count information before the change. Processing then transitions to step S286.

At step S280, the determination section 22 compares the count information of the final frame of the pitching composition scene subject to determination and the start frame of the next pitching composition scene. Next, at step S282, the determination section 22 determines whether or not the count information changed between the two frames in the result of the comparison of step S280 above. Processing transitions to step S284 in cases in which the count information changed. In cases in which the count information did not change, the determination section 22 determines that the pitching composition scene subject to determination is a scene representing noise such as a pickoff throw or the pitcher leaving the plate. Processing then transitions to step S286 without passing through step S266 or step S268.

At step S284, the determination section 22 determines whether or not any count information was detected in any of the frames included in the pitching composition scene subject to determination. Processing transitions to step S266 in cases in which count information was detected. In cases in which no count information was detected, the determination section 22 determines that the pitching composition scene subject to determination is a replay, and processing transitions to step S286 without passing through step S266 or step S268.

At step S286, the determination section 22 determines whether or not the processing of step S264 to step S268 has completed for all of the pitching composition scenes in the frame information table 26. When there are unprocessed pitching composition scenes, processing returns to step S262, an unprocessed pitching composition scene is selected, and the processing of step S264 to step S268 is repeated. Processing returns to the determination processing illustrated in FIG. 14 when processing has completed for all of the pitching composition scenes.

Next, at step S30 of the determination processing illustrated in FIG. 14, the generation section 23 generates metadata related to the pitching scenes. The metadata generated is, for example, information that associates a frame time of a frame representing the start of a pitch determined by the determination section 22 with information indicating the start of the pitch, and with information indicating the pitch result determined for the pitching scene starting from that frame.

Next, at step S32, the generation section 23 generates the metadata file 27 that stores the plural generated metadata in the sequence of the frame times included in the metadata. Then, the generated metadata file 27 is appended to the edited footage, and transmitted to the distribution device 30 as the metadata appended footage by the generation section 23, and the determination processing ends.

Figure 16:
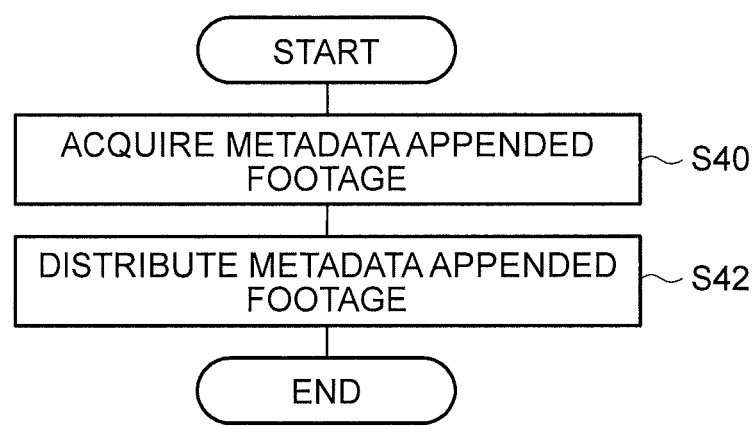
FIG. 16 is a flowchart illustrating an example of distribution processing.

Next, at step S40 of the distribution processing illustrated in FIG. 16, the distribution section 32 acquires the metadata appended footage transmitted from the determination device 20. Next, at step S42, the distribution section 32 converts the metadata appended footage to distribution footage according to the specified standards, and distributes the distribution footage to the distribution destination user terminal 40, and distribution processing ends.

As explained above, according to the determination device 20 of the present exemplary embodiment, pitching composition frames having a composition captured from behind the pitcher in the batter direction are detected from captured footage of a baseball game, and pitching composition scenes of plural consecutive pitching composition frames are identified. Moreover, count information is detected from the count display of each frame. Then, determination is made as to whether or not the count information changed between any of the frames included in a pitching composition scene subject to determination, or whether or not the count information changed between the final frame of the pitching composition scene subject to determination and the start frame of the next pitching composition scene. The start frame of the pitching composition scene subject to determination is determined as a frame representing the start of a pitch when the count information has changed. This enables the start of a pitch to be determined while filtering out scenes that would be unfilterable noise if simply determining the start frames of pitching composition scenes to be the frames indicating the start of pitches.

Moreover, information indicating the pitch result can also be acquired along with extraction of the pitching scene since the pitch result of the pitching scene starting from the frame indicating the start of the pitch is also determined based on the detected change in the count information.

Moreover, generating metadata including information indicating the frame representing the start of the pitch and appending the metadata to footage, enables the metadata appended footage to be cued by single pitch unit based on the metadata. For example, footage during pitches, replays, and the like in the metadata appended footage can be easily identified and viewed. Moreover, extraction of a pitching scene by single pitch unit to match search conditions for pitch results is possible when the metadata includes information indicating pitch results.

Although explanation has been given in the exemplary embodiment described above of cases in which a frame captured in the batter-direction from behind the pitcher is considered to be the pitching composition frame, the pitching composition frame is not limited thereto. For example, it is sufficient that the pitching composition frame is a frame captured at a characteristic camera angle employed in pitchers' pitching scenes, such as a frame captured from a camera mounted to the head of the umpire (a frame captured from the umpire in the pitcher-direction).

Moreover, in the exemplary embodiment above, explanation has been given of a case that envisages the entire captured footage being input to the determination device 20, and the metadata file 27 being generated for the entire footage, after the game has completed; however there is no limitation thereto. For example, when the captured footage is distributed live, metadata may be transmitted to the user terminal 40 through the distribution device 30 each time metadata is generated.

Figure 17:
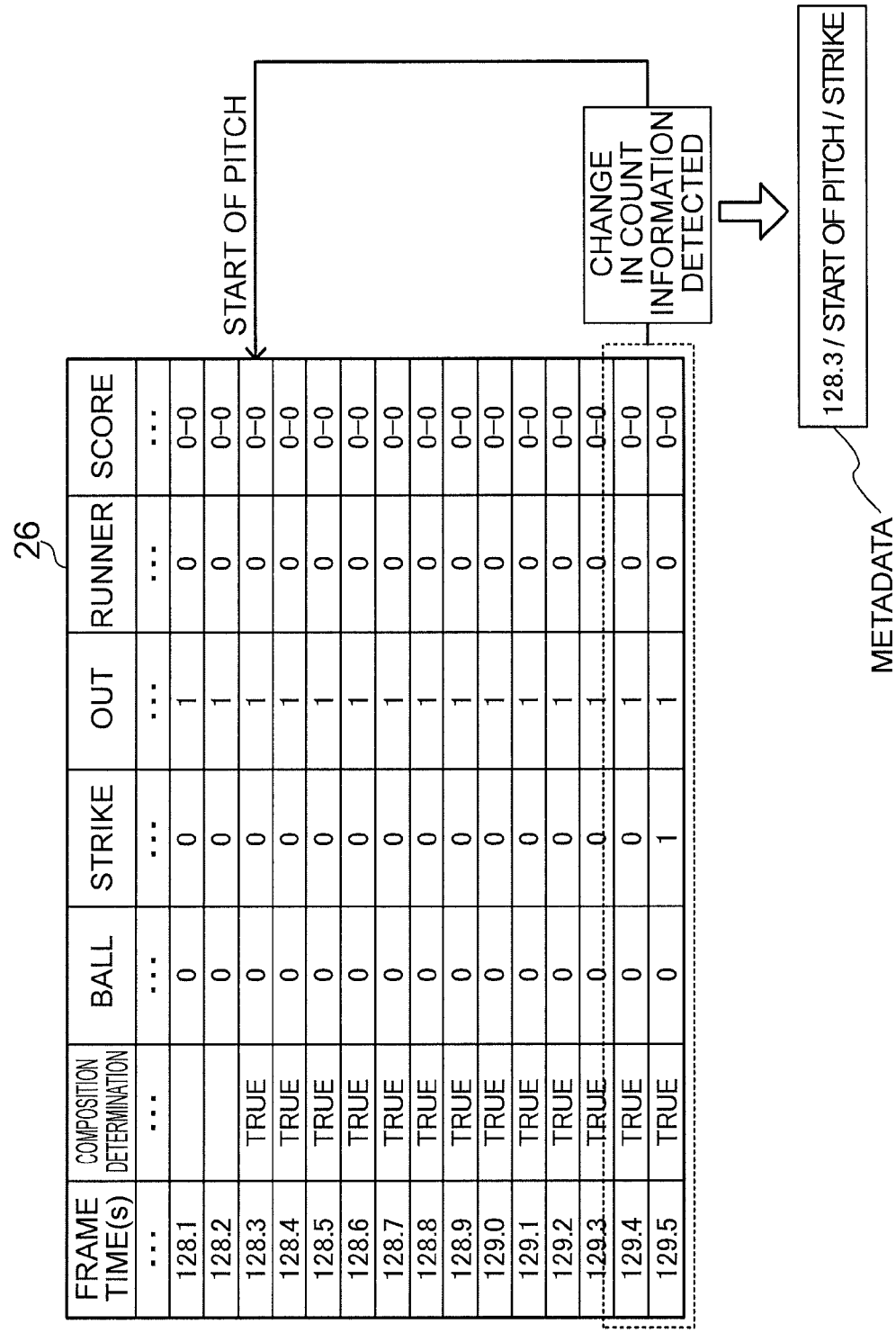
FIG. 17 is a diagram for explaining processing during live distributing.

Specifically, the frame information table 26 is successively updated as pitching composition scenes and count information of respective frames are detected from each frame of successively acquired captured footage. The frame information table 26 is then monitored for changes in the count information, and as illustrated in FIG. 17, the start frame of the pitching composition scene that is a frame representing the start of a pitch is identified, and moreover, the pitch result is determined, at the stage when a change in the count information is detected. Then, a piece of metadata, such as "128.3/start of pitch/strike" is generated, transmitted to the distribution device 30, and transmitted to the user terminal 40 from the distribution device 30. At the stage when the metadata is received, processing such as processing to cue a single pitch based on the metadata becomes possible in the user terminal 40.

When the count display 92 changes, sometimes effects are applied, such as making the brightness in the area that changed becomes progressively brighter, or making the area flash. In such cases, for example, as illustrated in FIG. 18, sometimes some of the count information is not detected (the cells shaded by diagonal lines in FIG. 18). In these situations, the count information may be compared between frames excluding the frames for which the count information is not detected. In the case of the example of FIG. 18, the strike count and the out count are not detected from the frames at frame times of from 129.1 to 129.4. Changes in both the strike count and the out count may be detected between the frame at frame time=129.0 and the frame at frame time 129.5.

Although explanation has been given in the exemplary embodiment described above of examples in which in the footage distribution system 10 includes a distribution device 30, and a determination device 20, there is no limitation thereto. Each functional section of the distribution device 30, and each functional section of the determination device 20 may be implemented by a single computer.

Moreover, the determination device of the technology disclosed herein is not limited to application to a footage distribution system. For example, configuration may be made such that a footage file stored on an external storage device connected over a network is acquired, the metadata file 27 is generated, and the metadata file 27 is stored again in the storage device along with the footage file. Moreover, the determination device of the technology disclosed herein is also applicable to sports other than baseball, such as softball.

Although explanation has been given above of a mode in which the determination program 60 is pre-stored (installed) on the storage section 53, and the distribution program 80 is pre-stored (installed) on the storage section 73, provision may be made in a recorded format on a recording medium, such as a CD-ROM, a DVD-ROM, or the like.

When footage is manually extracted for each inning as in related art, extracting footage for a single inning takes approximately 10 minutes. Moreover, in more detailed VoD content, consider, for example, VoD content capable of playback from each pitch delivered by a pitcher, footage needs to be cut out for each pitch, and there is an increased amount of manual labor.

One aspect of technology disclosed herein enables pitching scenes to be determined from captured footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing a determination program that causes a computer to execute a process, the process comprising:
    determining from captured footage of a baseball game including a plurality of frames stored in a storage section, a plurality of consecutive frames, which each have a specific characteristic to be potential pitching scenes;
    determining from the potential pitching scenes, a scene in which a change is detected in a ball count number, a strike count number, an out count number, or a runner number acquired from image information representing a game situation, to be a pitching scene; and
    outputting the determined pitching scene to a user terminal to be viewed by a user.

2. The non-transitory recording medium of claim 1, the process further comprising:
    when a change is detected in the ball count number, the strike count number, the out count number, or the runner number, extracting a leading frame of the plurality of consecutive frames as a frame representing a start of a pitch.

3. The non-transitory recording medium of claim 1, wherein, in the process, the plurality of consecutive frames having the specific characteristic is a plurality of consecutive frames from when the captured footage is captured from a specific angle until switching to a different angle from the specific angle.

4. The non-transitory recording medium of claim 1, the process further comprising:
    even when there is no change in the ball count number, the strike count number, the out count number, or the runner number, determining the plurality of consecutive frames to be a pitching scene when a difference is detected between the ball count number, the strike count number, the out count number, or the runner number in the captured footage and an acquired ball count number, strike count number, out count number, or runner number in a next detected frame having the specific characteristic after the plurality of consecutive frames.

5. The non-transitory recording medium of claim 1, the process further comprising:
    determining the plurality of consecutive frames to be a pitching scene when a change is detected in the ball count number, the strike count number, the out count number, or the runner number between a leading frame and a final frame in the plurality of consecutive frames.

6. The non-transitory recording medium of claim 1, the process further comprising:
    determining the plurality of consecutive frames to be a pitching scene when a change is detected in the ball count number, the strike count number, the out count number, or the runner number between a portion or all of respective frames in the plurality of consecutive frames, and a frame other than the portion or all of the respective frames.

7. A determination method, comprising:
    by a processor, determining from captured footage of a baseball game including a plurality of frames stored in a storage section, a plurality of consecutive frames, which each have a specific characteristic to be potential pitching scenes;
    determining from the potential pitching scenes, a scene in which a change is detected in a ball count number, a strike count number, an out count number, or a runner number acquired from image information representing a game situation, to be a pitching scene; and
    outputting the determined pitching scene to a user terminal to be viewed by a user.

8. The determination method of claim 7, further comprising:
    when a change is detected in the ball count number, the strike count number, the out count number, or the runner number, extracting a leading frame of the plurality of consecutive frames as a frame representing a start of a pitch.

9. The determination method of claim 7, wherein the plurality of consecutive frames having the specific characteristic is a plurality of consecutive frames from when the captured footage is captured from a specific angle until switching to a different angle from the specific angle.

10. The determination method of claim 7, further comprising:
    even when there is no change in the ball count number, the strike count number, the out count number, or the runner number, determining the plurality of consecutive frames to be a pitching scene when a difference is detected between the ball count number, the strike count number, the out count number, or the runner number in the captured footage and an acquired ball count number, strike count number, out count number, or runner number in a next detected frame having the specific characteristic after the plurality of consecutive frames.

11. The determination method of claim 7, further comprising:
    determining the plurality of consecutive frames to be a pitching scene when a change is detected in the ball count number, the strike count number, the out count number, or the runner number between a leading frame and a final frame in the plurality of consecutive frames.

12. The determination method of claim 7, further comprising:
    determining the plurality of consecutive frames to be a pitching scene when a change is detected in the ball count number, the strike count number, the out count number, or the runner number between a portion or all of respective frames in the plurality of consecutive frames, and a frame other than the portion or all of the respective frames.

13. A non-transitory recording medium storing a determination program that causes a computer to execute a process, the process comprising:
- determining a plurality of consecutive frames that have been extracted from captured footage of a baseball game including a plurality of frames stored in a storage section and that each have a specific characteristic to be potential pitching scenes;
- using a change in a ball count number, a strike count number, an out count number, or a runner number acquired from image information representing a game situation to determine a scene from the potential pitching scenes to be a pitching scene; and
- outputting the determined pitching scene to a user terminal to be viewed by a user.

* * * * *